US008673420B2

(12) United States Patent
Van Seggelen et al.

(10) Patent No.: US 8,673,420 B2
(45) Date of Patent: Mar. 18, 2014

(54) MASTER DISC HAVING A PTM LAYER AND A NICKEL UNDERCOAT

(75) Inventors: Winand Van Seggelen, Eindhoven (NL); Jeroen Tossaint, Eindhoven (NL); Joep Wijn, Eindhoven (NL); Hamid El Majdoubi, Eindhoven (NL); Roland Tacken, Eindhoven (NL)

(73) Assignee: Singulus Mastering B.V., Eindhoven (NL)

( * ) Notice: Subject to any disclaimer, the term of this patent is extended or adjusted under 35 U.S.C. 154(b) by 8 days.

(21) Appl. No.: 13/261,102

(22) PCT Filed: May 26, 2010
(Under 37 CFR 1.47)

(86) PCT No.: PCT/EP2010/057274
§ 371 (c)(1),
(2), (4) Date: Mar. 20, 2012

(87) PCT Pub. No.: WO2010/149456
PCT Pub. Date: Dec. 29, 2010

(65) Prior Publication Data
US 2013/0064063 A1    Mar. 14, 2013

(30) Foreign Application Priority Data
Jun. 24, 2009 (EP) .................................... 09163672

(51) Int. Cl.
*G11B 7/24* (2013.01)
(52) U.S. Cl.
USPC ................ 428/64.1; 428/64.4; 430/270.13

(58) Field of Classification Search
USPC ..................... 428/64.4; 430/270.13
See application file for complete search history.

(56) References Cited

U.S. PATENT DOCUMENTS

| 2004/0256762 A1 | 12/2004 | Ito et al. ......................... 264/219 |
| 2006/0291369 A1 | 12/2006 | Yoon et al. ..................... 369/288 |
| 2007/0184233 A1 | 8/2007 | Meinders et al. ............. 428/64.4 |
| 2008/0137504 A1 | 6/2008 | Meinders et al. ........... 369/59.12 |
| 2008/0152936 A1* | 6/2008 | Meinders et al. ........... 428/542.8 |
| 2008/0265449 A1 | 10/2008 | Meinders et al. ............. 264/1.27 |
| 2009/0201793 A1 | 8/2009 | Meinders et al. ............. 369/1.36 |

FOREIGN PATENT DOCUMENTS

| EP | 1741 102 | 12/2008 | ............... G11B 7/26 |
| WO | WO 2006/045332 | 5/2006 | ............... G11B 7/26 |

* cited by examiner

*Primary Examiner* — Elizabeth Mulvaney
(74) *Attorney, Agent, or Firm* — Ohlandt, Greeley, Ruggiero & Perle, LLP

(57) ABSTRACT

The invention provides a master disc comprising a stack of a substrate, a phase transition material layer, a heat absorption layer provided between the substrate and the phase transition layer, and an anisotropic heat sink layer provided between the substrate and the absorption layer. Further, a method of manufacturing a master disc is provided. A stack having an upper side and a lower side is provided, wherein the stack comprises a substrate provided at the lower side of the stack, a phase transition material layer, a heat absorption layer provided between the substrate and the phase transition layer, and an anisotropic heat sink layer provided between the substrate and the absorption layer. The upper side of the stack is exposed to a laser beam and developed.

19 Claims, 4 Drawing Sheets

MASTER DISC HAVING A PTM LAYER AND A NICKEL UNDERCOAT

This patent Application is a US National Phase Patent Application from PCT Application No. PCT/EP2010/057274, filed May 26, 2010 and claiming priority from European Patent Application Nos. 09163672.0, filed Jun. 24, 2009.

FIELD OF THE INVENTION

The invention relates to a master disc having a phase-transition-material (phase-change-material) layer and a method for producing the same.

BACKGROUND TO THE INVENTION

The standard technology for making master discs for optical media uses a lithographic process based on a photoresist. For example, in a manufacturing method for a master disc, a photoresist layer on a substrate is exposed by a radiation beam: a photoresist mastering process is generally based on a photochemical process that takes place in the photoresist when it is illuminated with a laser beam. Every photon entering the photoresist has a certain chance of inducing a chemical change in the photoresist. This implies that every photon in the writing spot can result in a chemical change and that the region where chemical changes take place is theoretically infinite. However, chemical changes in the photoresist may cumulate when the photoresist receives multiple exposure doses. This means that earlier induced chemical changes may increase due to intersymbol interference during mastering.

Master discs manufactured on the basis of an optical process may also be used as a basis for stampers for the mass replication of read-only memory (ROM) and pre-grooved write-once (R) and rewritable (RE) discs.

During manufacturing, a thin photosensitive layer on a substrate can be illuminated with a laser beam to obtain exposed areas of the layer. Further, the exposed areas may be dissolved in a development process to form physical holes in the photoresist layer.

Recently, phase-transition mastering (PTM) has become a new method to make high-density ROM and RE/R stampers for mass-fabrication of optical information carriers. In particular, phase-transition materials can be transformed from their initial unwritten state to a different state via laser-induced heating. Heating can, for example, cause mixing, melting, amorphisation, phase-separation, decomposition, etc. in the material or layer. One of the two phases, the initial or the written state, dissolves faster in acids or alkaline developer liquids than the other phase does. Due to this characteristic behavior, a written data (information) pattern can be transformed to a kind of relief structure with protruding bumps or pits. The patterned carrier can then be used as stamper for mass-fabrication of high-density optical discs or as stamp for micro-contact printing.

One of the challenges encountered with PTM is to obtain a good pit shape. Since the whole method is based on heating, the shape might be determined by the temperature profile in the recording stack. The problem lies in the fact that most materials have either a rather high thermal conductivity (e.g. most metals) or a rather low thermal conductivity (e.g. most dielectrics). However, materials with a high thermal conductivity often have a bad optical absorption profile. While the heat is penetrating the stack of layers, the thermal conductivity gives a rapid cooling and thus a rapid decrease in the maximum temperatures that are reached locally. This makes it difficult to get the needed pit depth. Materials with a low thermal conductivity have a more localized heat built-up (which may be advantageous for a good pit shape), but getting the needed temperatures requires high writing powers when the optical absorbance is low.

It is therefore an object of the present invention to provide a master disc and a method for producing a master disc having a good pit shape.

The above objects are achieved by the features of the subject-matter of the claims.

SUMMARY OF THE INVENTION

According to the invention, a master disc with a substrate and a phase transition material layer is provided. In a particular embodiment, the master disc has the following layers deposited in this order on the substrate: an anisotropic heat sink layer, a heat absorption layer, and a phase transition material layer.

A substrate for the master disc may be made of glass or may be a mirror and may comprise metals like Ag or Al etc. as reflective coating.

A phase-transition material or phase-change material is a material that changes it physical properties if a certain amount of energy (for example, by means of a laser beam) is put into it. For example, the structure of a layer made from such a material may change from amorphous to crystalline or vice versa, depending on the initial state of the material. This change may result in a difference in solubility, between areas exposed and areas unexposed to the laser beam, in selected fluids. Further, such a change may only occur at a certain temperature level in the material. The temperature of the material depends on the photon flux into the material and on the material properties. A very small region of the exposure spot can be used for this physical change, as a certain threshold heat need to be passed before the phase transition takes place.

This property may give the material its advantageously high resolution for mastering. When using a phase-transition material for mastering, a higher resolution, i.e. smaller details, at the same mastering wavelength may be obtained, compared to an usual photoresist mastering process. The present invention thus allows to make mastering of high-density masters, for example due to the use of a phase-transition material layer.

A heat absorption layer may be made from Si, Ag, Al, SbTe, Ge, AgInSbTe and should preferably be etch-resistant. Also other (semi-)conductor materials may be suitable, as long as they can be sputtered on in an amorphous state.

An anisotropic heat sink layer provides a high thermal conductivity and is a layer showing anisotropy in thermal behavior. For example, the heat conduction in lateral direction may be lower then the conduction in the direction towards the substrate.

This property may advantageously reduce the intersymbol interference: the lateral spread of the generated heat in the heat absorption layer may be minimized, since the drain of heat into the anisotropic heat sink layer may be very fast (due to the anisotropy). In doing so, mutual influencing of written pits may be limited to a great extent compared to the situation when the stack does not comprise such a layer.

In a particular embodiment, the phase transition material layer may comprise $ZnS-SiO_2$, GeInSbTe, GeSbTe, AgInSbTe, Ag-doped GeSbTe, or a combination of two or more thereof.

In a particular embodiment, the phase transition material layer may be a $ZnS-SiO_2$ layer. At room temperature, a ZnS—SiO$_2$ layer may contain nanosized ZnS particles embedded in a SiO$_2$ matrix. The size of the nanocrystals is temperature-dependent, and a temperature increase may initiate a growth in size of the nanocrystals, thus leading to a blue-shift in the light absorption range of this phase-transition material.

In an embodiment, the ZnS—SiO$_2$ layer may be a sputter-deposited layer.

For example, sputtered ZnS—SiO$_2$ may be used as phase-transition (phase-change) material for mastering purposes. Advantageously, ZnS—SiO$_2$ may show a strong dependence of etch speed in acidic etching liquids as a function of the temperature to which it has been heated. Heating of the material may be realized by laser exposure and may be done directly (i.e. absorption by the ZnS—SiO$_2$) and/or indirectly, for example due to absorption by a layer deposited below or on top of the ZnS—SiO$_2$ layer or by the substrate itself.

In a particular embodiment, the heat absorption layer may be a Si layer, more particularly an amorphous Si layer.

The presence of a heat absorption layer may be advantageous, since the absorption of ZnS—SiO$_2$ is almost zero in the visible wavelength region. Therefore, an absorption layer may be required to heat up the ZnS—SiO$_2$ material up to a temperature of approximately 600-900° C. to bring about a temperature-induced phase transition. One of the possibilities is to add an absorption layer underneath the phase-transition material layer. In such a configuration, mark formation starts from the bottom part of the phase-transition layer.

Silicon is a very suitable absorption layer material: Si has a good absorption in the blue wavelength range. Further, the use of silicon may be advantageous, since silicon is etch-resistant and thus a natural barrier for a developer liquid as, for example, HNO$_3$ or HCl. Moreover, Si can be deposited in an amorphous state. The absence of structure in the amorphous phase may be beneficial since the homogeneity of the phase change process of the material deposited on top of it (e.g. ZnS—SiO$_2$) may be optimal, for example, if properties of the absorption layer are isotropic and not influenced by any crystal structure.

The advantageous heat absorption layer, for example a Si layer underneath the phase-transition material layer, may act as a mark formation initiator. In particular, the phase-transition material, e.g. ZnS—SiO$_2$, layer may be indirectly heated by heat diffusion from the silicon layer. Particularly, the absorption coefficient of the phase-transition material is temperature-dependent, so that the phase-transition material layer may also start to absorb incident laser light once the phase-transition material heats up (for example, due to the heat conduction from the heat absorption layer). This scenario may be comparable to an avalanche effect: the phase-transition material itself starts absorbing energy, and thus less laser power is required to induce the desired phase transition. In other words: the process advantageously accelerates.

In a particular embodiment, the heat sink layer may be a Ni layer, particularly a sputtered Ni layer, more particularly a sputtered Ni film.

Ni shows the above discussed advantages of an anisotropic heat sink layer. In the case of sputtered Ni, the columnar structure which may be obtained shows the desired anisotropic behavior. The columnar structure is further displayed in FIG. 3 below. A "film" means a particularly thin layer having a thickness of not more than 100 nm, particularly not more than 60 nm.

In a particular embodiment, the heat sink layer may have a thickness of at least 25 nm, particularly at least 40 nm, more particularly at least 80 nm.

In a particular embodiment, the phase transition material layer may have a thickness of less than 100 nm, particularly less 75 nm, more particularly less than 60 nm.

In a particular embodiment, the master disc comprises a stack consisting of the substrate, the anisotropic heat sink layer, the heat absorption layer, and the phase transition material layer. In this case, the anisotropic heat sink layer is directly adjacent to the heat absorption layer which is directly adjacent to the phase-transition material layer.

According to the invention, a method of manufacturing a master disc is provided. A stack having an upper side and a lower side is provided, wherein the stack comprises a substrate provided at the lower side of the stack, a phase transition material layer, a heat absorption layer between the substrate and the phase transition layer, and an anisotropic heat sink layer between the substrate and the absorption layer. Further, the upper side of the stack is exposed to a laser beam and developed.

The features of the method as defined above and, further, the features described below, may show the same properties and/or advantages as discussed above in connection with the master disc.

For example, the upper side of the stack may be the upper side of the phase-transition material layer. Optionally, an additional heat absorption layer may cover the upper side of the phase-transition material layer. In this case, the phase-transition material layer may be provided between the two heat absorption layers.

A development of the upper side of the stack may be carried out by using a developer liquid as, for example, nitric acid, hydrochloric acid, sulphamic acid, sulfuric acid, oxalic acid, acetic acid or phosphoric acid.

In a particular embodiment, the stack consists of the substrate, the anisotropic heat sink layer, the heat absorption layer, and the phase-transition material layer.

In a particular embodiment, the phase-transition material's structure may change from amorphous to crystalline upon exposure to heat. With respect to any recording in such a material, crystal growth or a melting process can be controlled in order to record the master disc: a mark may be made with a single laser pulse or with a pulse train (a sequence of pulses).

In a particular embodiment, the laser beam may be directed and modulated to form a predetermined pattern in the upper side surface of the stack. Particularly, the laser beam may be directed and modulated to form a predetermined pattern in the upper side surface of the stack visible after development.

For example, the modulation of the laser beam may cause some parts of the upper side being exposed by light whereas the intermediate areas in between the "pits" to be formed advantageously remain unexposed.

In a particular embodiment, the method may comprise a step of etching the exposed upper side of the stack.

In a particular embodiment, an acid, like chloric acid, may be used as etchant to remove the unexposed areas.

In a particular embodiment, the laser beam may have a wavelength of 250 to 460 nm, particularly 400 to 410 nm, and more particularly 405 nm.

In a particular embodiment, the method may comprise a sputtering step depositing a thin layer of Ni on the upper side surface of the developed stack. In doing so, galvanic growth of the stamper may be enabled. Particularly, the thin layer of Ni has a thickness of less than 30 nm, preferably less than 20 nm.

In a particular embodiment, the method may comprise a step of baking the stack at a temperature where the phase transition material layer crystallizes. More particularly, the baking step takes place after developing the stack.

For example, the crystallization temperature of a particular material may depend on the atomic components of the material.

In a particular embodiment, the method may comprise a step of electroforming the stack to produce a stamper.

For example, the electroforming step may be carried out after the baking of the stack.

In a particular embodiment, the electroforming step is carried out without having deposited a Ni layer on the developed stack. In this case, the heat absorption layer may have a thickness of less than 50 nm, preferable less than 30 nm, more preferable about 20 nm, and may be a Si layer. The Ni layer may not be necessary if the heat absorption layer is thin enough for an electric field to penetrate it.

Electroforming is a process of metal part fabrication using electrodeposition in a plating bath over a particular form forming the basis for the deposition. In particular, the electrodeposition of metal passing through an electrolytic solution onto a metal or metallized form is controlled. For example, an electrolytic bath is used to deposit an electroplatable metal onto a conductive patterned surface. Once the plated material has been built up to a desired thickness, the electroformed part, e.g. a stamper, is removed from the substrate.

In particular, an additional galvanic reproduction step may be carried out, for example, if the recorded substrate may contain bumps instead of pits and since the stamper contains bumps. In further applications, the stamper may be used in an injection molding machine for mass replication of media.

BRIEF DESCRIPTION OF THE DRAWINGS

In the following, the invention is described in more detail with reference to the Figures.

DETAILED DESCRIPTION OF THE INVENTION

Figure 1:
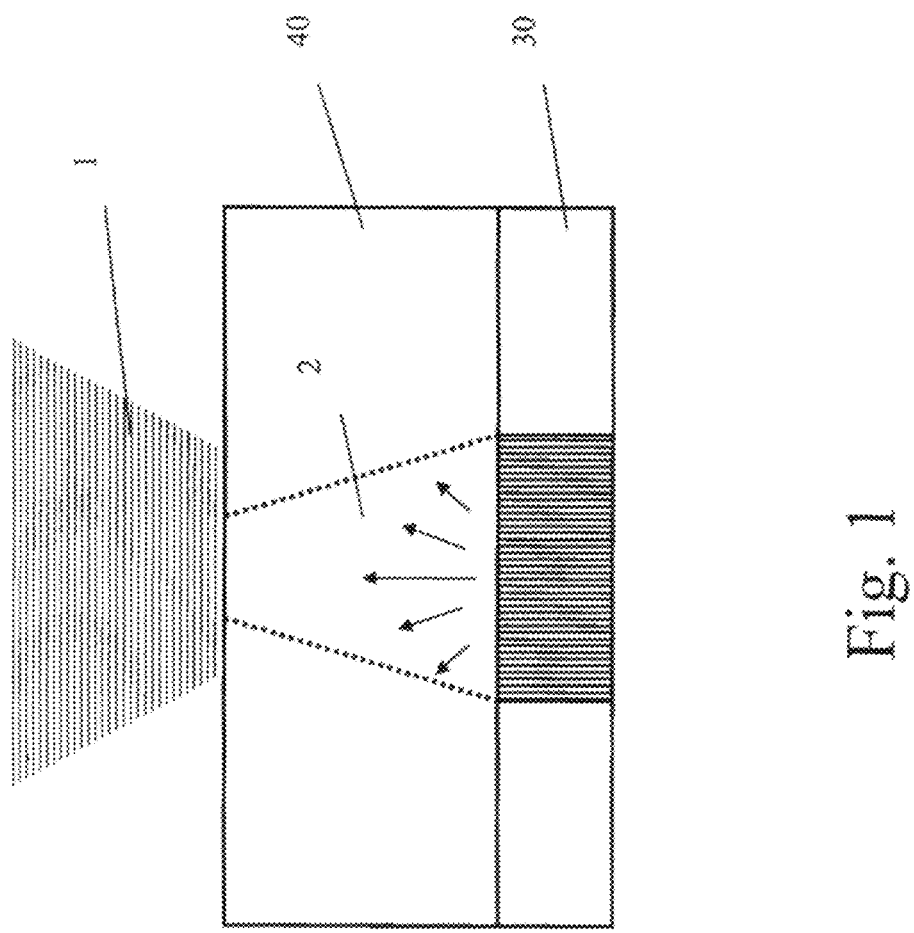
FIG. 1 schematically shows a general concept of bump/pit formation.

FIG. 1 schematically shows the general concept of producing marks in/on a layer structure for a master disc. In particular, a stack of an absorption layer 30, e.g. a Si layer, and a phase transition material layer 40, e.g. a ZnS—SiO$_2$ layer, is provided. An incident laser beam 1 is directed onto the stack. In the shown case, the phase transition material layer 40 is indirectly heated by heat diffusion 2 from the absorption layer 30 absorbing the laser beam 1. In particular, the absorption coefficient of the phase transition material layer 40 is temperature-dependent and will start to absorb the incident laser light 1 if the phase transition material layer 40 heats up due to the heat conduction from the absorption layer 30 below. In doing so, less laser power is required to induce a phase transition in the PTM layer 40.

Figure 2:
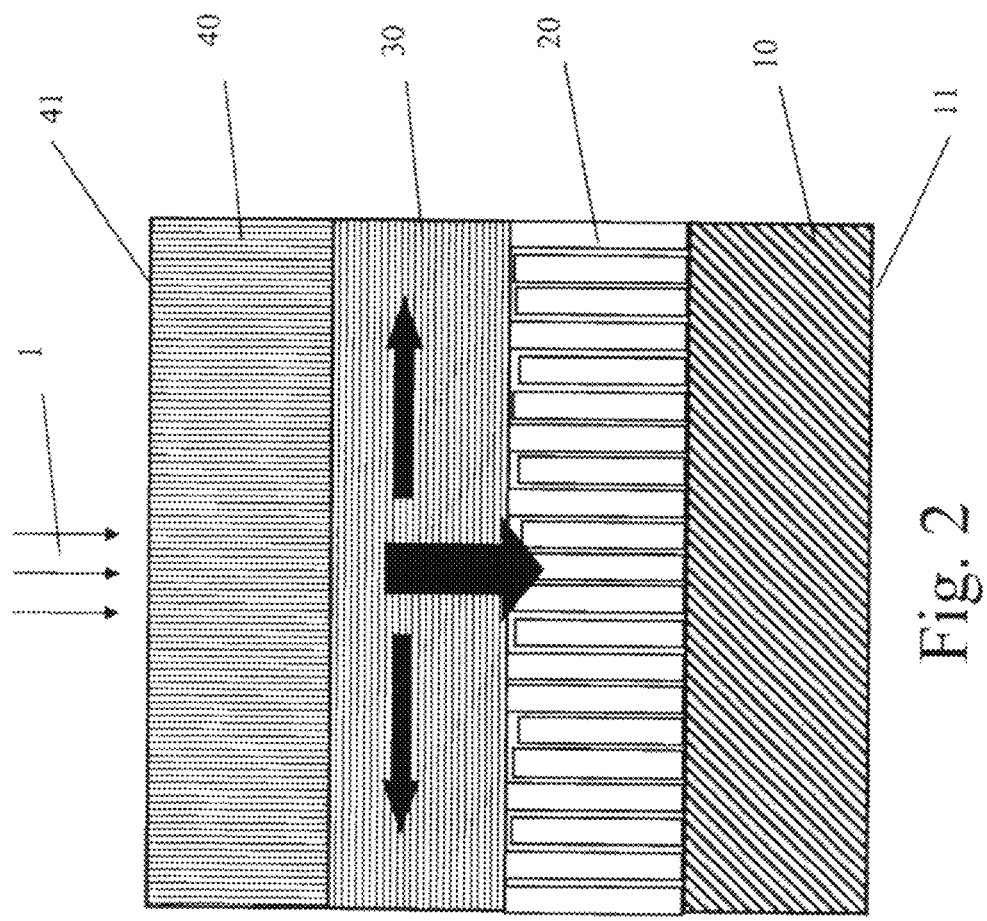
FIG. 2 schematically shows an embodiment of a PTM stack.

FIG. 2 schematically shows an embodiment of a stack of layers for a master disc. In particular, the shown stack (10, 20, 30, 40) provides an upper side 41 and a lower side 11. Further, the stack comprises a substrate 10, e.g. a glass substrate, an anisotropic heat sink layer 20, e.g. a Ni layer, a heat absorption layer 30, e.g. a Si layer, and a phase transition material layer 40, e.g. a ZnS—SiO$_2$ layer. An incident laser beam 1 may be absorbed by the heat absorption layer 30 underneath the PTM layer 40. However, due to the fact that the anisotropic heat sink layer 20 is provided directly below the absorption layer 30, the lateral spread of the generated heat (as indicated by the bold black arrows) in the absorption layer 30 is minimized: the drain of the heat into the heat sink layer 20 is very fast due to the layer's anisotropy in its thermal behavior. Advantageously, the anisotropic sink layer 20 provides a heat conduction which is lower in lateral direction (parallel to the upper side 41 or lower side 11 of the stack) than in the direction perpendicular to the upper side 41 or lower side 11 of the stack.

Figure 3:
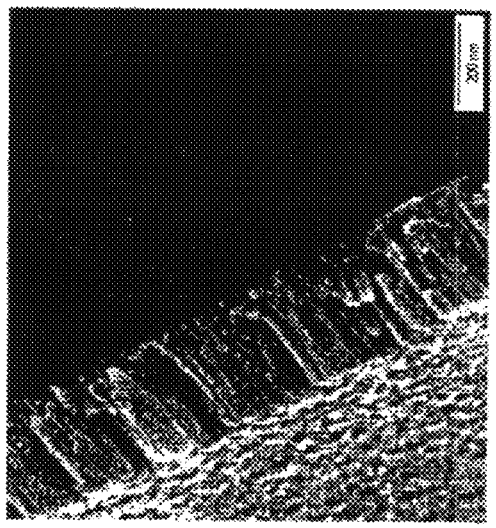
FIG. 3 shows a microstructure of Ni.

FIG. 3 shows an example for a material (in this case: Ni) providing anisotropy in thermal behavior: in this embodiment, the sputtered Ni layer has a columnar microstructure with columns perpendicular to the upper or lower surface of a substrate. Thus, the sputtered Ni layer may advantageously provide the desired anisotropy for the heat sink layer.

Figure 4:
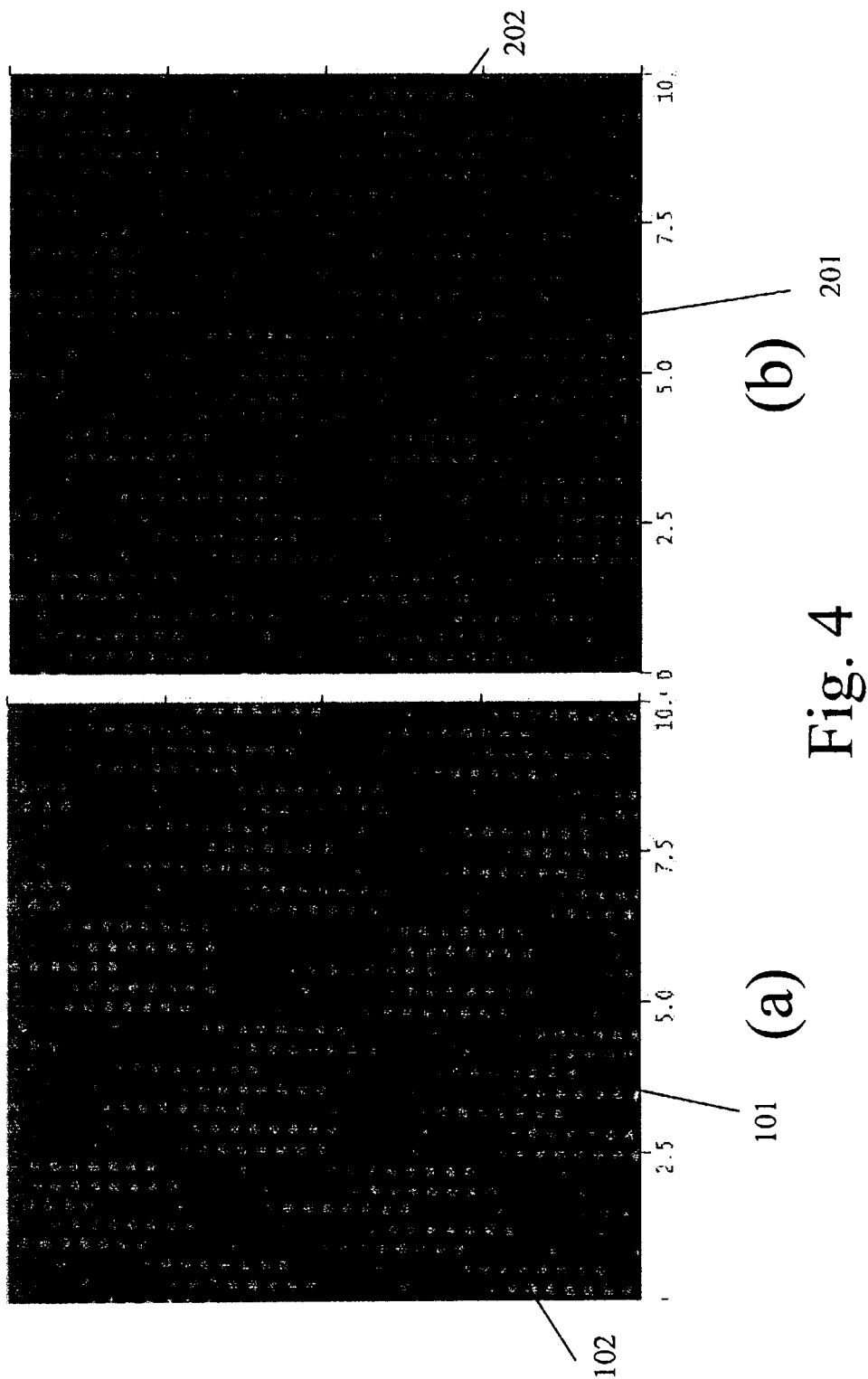
FIG. 4 shows a master disc (a) without and (b) with anisotropic heat sink layer.

FIG. 4 shows a master disc recording performed without (FIG. 4(a)) and with (FIG. 4(b)) anisotropic heat sink layer. In FIG. 4(a), it is clearly visible that both, the isolated "stand-alone" marks (see, for example, reference "101") as well as the first marks of "eight-in-a-row" (recording direction from top to bottom; see, for example, reference sign "102") are smaller than the marks that are in the middle of a row. FIG. 4(b) shows the corresponding situation if an anisotropic heat sink layer is used as discussed above: the effect of different sizes of the marks is minimized, and the size of the "stand-alone" marks (see, for example, reference "201") becomes essentially equal to the size of the "in-a-row" marks (see, for example, reference "202").

In a particular embodiment, it was found that the size differences of the marks as discussed above with reference to FIG. 4 may be further minimized by providing large thicknesses for the anisotropic heat sink layer.

For example, the length (mean diameter) of the first mark in a row (as discussed above with reference to FIG. 4) was measured by means of an atomic force microscopy and compared to that of the next marks in the row. The results for a particular embodiment are shown in the table below.

| Sputtered nickel thickness [nm] | Mean length 1$^{st}$ mark [nm] | Mean length 2nd-8th mark [nm] | Length difference [nm] |
|---|---|---|---|
| 35 | 158.7 | 181.7 | 23.0 |
| 105 | 164.5 | 176.5 | 12.0 |
| 105 | 159.9 | 171.6 | 11.8 |
| 200 | 189.5 | 198.3 | 8.8 |

As it is derivable from the above, the difference in length is reduced dependent on the larger thickness of the sputtered Ni layer. It was observed that with increasing Ni layer thickness also the layer roughness increased to beyond RA=2 nm at 200 nm thickness. This is an undesired effect. Trade-off between layer thickness and roughness resulted in an optiomum layer thickness of about 100 nm.

As shown above, the presence of an anisotropic heat sink layer, e.g. a sputtered Ni layer, underneath the heat absorption layer, e.g. a Si layer, increases the homogeneity of mark formation at the upper side (the upper side surface) of a stack for a master disc. In particular, the above concept makes the formation of the marks less dependent on its local surroundings due to the faster and anisotropic removal of the generated heat.

While the invention has been illustrated and described in detail in the drawings and foregoing description, such illustration and description are to be considered illustrative or exemplary and non-restrictive; the invention is thus not limited to the disclosed embodiments. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures can not be used to advantage.

The invention claimed is:

1. A master disc comprising a stack of at least the following in that order:
   (a) a substrate (10),
   (b) an anisotropic Ni heat sink layer (20),
   (c) a heat absorption layer (30),
   (d) a phase transition material layer (40).

2. The master disc of claim 1, wherein the phase transition material layer (40) comprises ZnS—SiO$_2$, GeInSbTe, GeSbTe, AgInSbTe, Ag-doped GeSbTe, or a combination of two or more thereof.

3. The master disc of claim 2, wherein the phase transition material layer (40) is a ZnS—SiO$_2$ layer.

4. The master disc of claim 1, wherein the heat absorption layer (30) is a Si, Ag, Al, or SbTe layer.

5. The master disc of claim 1, wherein the thickness of the heat sink layer (20) has a thickness of at least 25 nm.

6. The master disc of claim 1, wherein the phase transition material (40) layer has a thickness of less than 100 nm.

7. A method of manufacturing a master disc by:
   providing a stack having an upper side (41) and a lower side (11), the stack providing at least the following layers in that order: a substrate (10) provided at the lower side of the stack, an anisotropic Ni heat sink layer (20), a heat absorption layer (30), and a phase transition material layer (40) provided at the upper side of the stack,
   exposing the upper side of the stack to a laser beam, and developing the upper side of the stack.

8. The method of claim 7, wherein the laser beam is directed and modulated to form a predetermined pattern in the upper side of the stack.

9. The method of claim 7, comprising a step of:
   etching the exposed upper side of the stack.

10. The method of claim 7, comprising a step of:
    baking the stack at a temperature where the phase transition material layer crystallizes.

11. The method of claim 7, comprising a step of:
    depositing a layer of Ni on the upper side (41) of the stack after the developing step.

12. The method of claim 7, wherein the laser beam has a wavelength of 250 to 460 nm.

13. The method of claim 7, comprising a step of:
    electroforming the stack after developing to produce a stamper.

14. The method of claim 9, comprising the step of:
    electroforming the stack after etching to produce a stamper.

15. The method of claim 7, wherein the laser beam has a wavelength of 400 to 410 nm.

16. The method of claim 7, wherein the laser beam has a wavelength of 405 nm.

17. The method of claim 7 comprising the step of
    sputtering the Ni layer forming the heat sink layer.

18. The master disc of claim 1, wherein the thickness of the heat sink layer is at least 40 nm.

19. The master disc of claim 2, wherein the thickness of the phase transition material layer is less than 75 nm.

* * * * *